J. P. CORBETT.
RIM BRACE AND TIRE CLAMP.
APPLICATION FILED MAR. 29, 1912.
1,052,572. Patented Feb. 11, 1913.
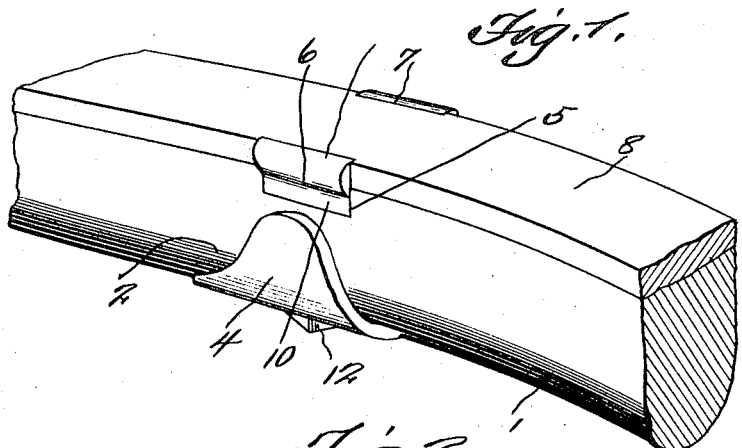
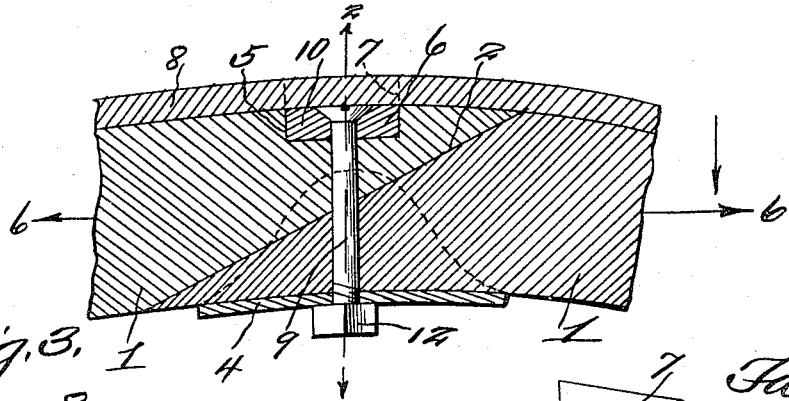
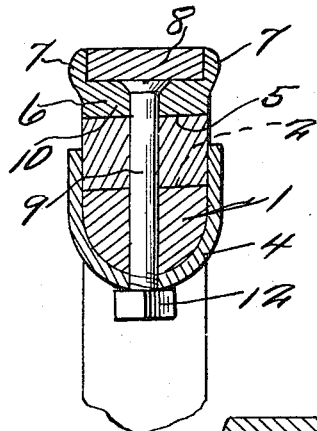
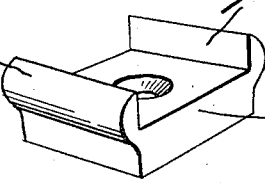
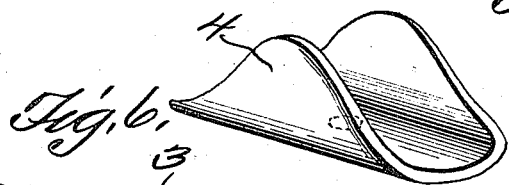
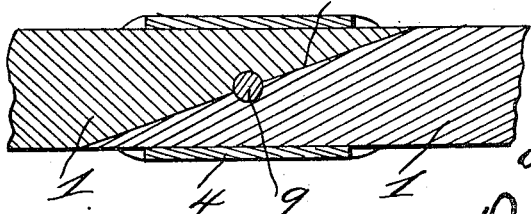
Witnesses
Francis G. Boswell,
C. E. Clement.
Inventor
J. P. Corbett,
By D. Swift & Co.
Attorneys

UNITED STATES PATENT OFFICE.

JOHN P. CORBETT, OF FAYETTE, ALABAMA.

RIM-BRACE AND TIRE-CLAMP.

1,052,572.　　　　Specification of Letters Patent.　　Patented Feb. 11, 1913.

Application filed March 29, 1912. Serial No. 687,265.

*To all whom it may concern:*

Be it known that I, JOHN P. CORBETT, a citizen of the United States, residing at Fayette, in the county of Fayette and State of Alabama, have invented a new and useful Rim-Brace and Tire-Clamp; and I do hereby declare the following to be a full, clear, and exact description of the invention, such as will enable others skilled in the art to which it appertains to make and use the same.

This invention relates to a new and useful rim brace and tire clamp.

It is the aim of this invention to provide a simple, inexpensive and practical combination rim brace and tire clamp, and one in which essential and desirable features of construction exist.

One of the features of the invention, as well as an advantage is the fact that the tire is provided with oppositely arranged shallow recesses to receive the upstanding sides of a U-shaped clamp, which is seated in a transverse recess of the rim, thus preventing creeping of the tire, as well as lateral movement thereof, the recesses not being deep enough to weaken the tire.

The features are hereinafter set forth, shown in the drawings and claimed.

In the drawings:—Figure 1 is a view in perspective, showing a section of a wheel rim, with the clamp and brace applied thereto. Fig. 2 is a sectional view. Fig. 3 is a transverse sectional view on line 2—2 of Fig. 2. Fig. 4 is a detail view of the tire clamp. Fig. 5 is a detail view of the rim brace. Fig. 6 is a horizontal sectional view, showing the rim spliced differently to that shown in Fig. 2.

Referring to the drawings 1 designates the rim of the wheel, which may be spliced as shown in Fig. 1 at 2, or as shown at 3 in Fig. 6. In either case the brace 4 holds the spliced ends of the rim together. This brace is U-shaped in cross section, as shown in Fig. 3, and engages on each side of the rim. The rim is provided with a recess 5, in which a U-shaped clamp 6 is seated. The flanges 7 (which are offset from the body of the clamp) engage, one upon each side of the tire 8 in recesses 7ª, thereby preventing lateral displacement and creeping of the tire. To hold the clamp securely in the recess, a bolt 9 penetrates the body 10 thereof, with the head of the bolt counter-sunken in the body. This bolt also penetrates the brace and is secured in position by the nut 12. The bolt and nut performs two functions, first to anchor the clamp 6 in place, and second to hold the brace 4 in position.

It will be noted that the body of the clamp has its edges flushed with the rim, while the flanges are slightly counter-sunken in the tire, so as to prevent creeping of the same.

The invention having been set forth, what is claimed as new and useful is:—

In combination, a wheel rim having its ends beveled and overlapped and provided with a transversely disposed recess, a U-shaped clamp having its body base seated in the recess, a U-shaped brace fitting under the rim and having its side portions overlapping the beveled overlapped ends to hold them in position, a bolt penetrating the clamp and the beveled overlapped ends with its head countersunken in the clamp and its threaded end extending through the brace with a nut threaded thereon beneath the brace to hold the parts securely clamped together, and a tire on the rim arranged between the sides of the U-shaped clamp and provided with oppositely arranged recesses to receive the side of the clamp to prevent creeping of the tire as well as lateral movement thereof.

In testimony whereof I have signed my name to this specification in the presence of two subscribing witnesses.

JOHN P. CORBETT.

Witnesses:
　J. A. SMITH,
　HOLLAND M. BELL.